United States Patent
Andreev et al.

(10) Patent No.: US 7,050,582 B1
(45) Date of Patent: May 23, 2006

(54) PSEUDO-RANDOM ONE-TO-ONE CIRCUIT SYNTHESIS

(75) Inventors: Alexander E. Andreev, San Jose, CA (US); Igor A. Vikhliantsev, Santa Clara, CA (US); Ranko Scepanovic, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 809 days.

(21) Appl. No.: 09/883,733

(22) Filed: Jun. 18, 2001

(51) Int. Cl.
*H04K 1/00* (2006.01)
*H04L 9/00* (2006.01)

(52) U.S. Cl. .......................... 380/28; 380/268; 380/37; 380/29; 380/42; 380/46

(58) Field of Classification Search ................ 380/28, 380/268
See application file for complete search history.

(56) References Cited

U.S. PATENT DOCUMENTS

| | | | | | |
|---|---|---|---|---|---|
| 4,275,265 | A | * | 6/1981 | Davida et al. | 380/29 |
| 5,473,693 | A | * | 12/1995 | Sprunk | 380/29 |
| 5,608,801 | A | * | 3/1997 | Aiello et al. | 380/46 |
| 5,623,549 | A | * | 4/1997 | Ritter | 380/37 |
| 5,838,795 | A | * | 11/1998 | Mittenthal | 380/28 |
| 5,838,796 | A | * | 11/1998 | Mittenthal | 380/28 |
| 6,005,944 | A | * | 12/1999 | Blaze | 380/42 |
| 6,751,319 | B1 | * | 6/2004 | Luyster | 380/37 |
| 2001/0038693 | A1 | * | 11/2001 | Luyster | 380/37 |

* cited by examiner

*Primary Examiner*—Gilberto Barron, Jr.
*Assistant Examiner*—Samson Lemma
(74) *Attorney, Agent, or Firm*—Christopher P. Maiorana PC (57) ABSTRACT

A method of defining a transformation between an input signal and an output signal. The transformation may implement a pseudo-random one-to-one function that may be implemented in hardware and/or software or modeled in software. The method may comprise the steps of (A) allocating the input signal among a plurality of block input signals, (B) establishing a plurality of transfer functions where each transfer function may be configured to present a plurality of unique symbols as a block output signal responsive to said block input signal, and (C) concatenating the block output signals to form the output signal.

18 Claims, 8 Drawing Sheets

PSEUDO-RANDOM ONE-TO-ONE CIRCUIT SYNTHESIS

FIELD OF THE INVENTION

The present invention relates to a method of automatic netlist generation generally and, more particularly, to synthesis of a pseudo-random one-to-one circuit in forward and inverse directions.

BACKGROUND OF THE INVENTION

The development of search engines for searching large databases of data is important to many fields. Examples of such fields include semiconductor and integrated circuit chip design and networking applications such as Internet universal resource locator look-ups in high performance routers. Searching the large databases requires increased time and/or hardware requirements resulting in expensive systems in terms of increased search delays and larger memories.

New search engines require reference databases having known data values to verify proper operation. Generation of large reference databases is an area that has not seen significant attention. The large reference databases require large numbers of unique non-repeating data values so that every test search produces a unique output. Conventional database architectures also require that each unique data value have an associated key or prefix to aid in the search operations. To provide a realistic reference database, a random or pseudo-random relationship is required between the keys/prefixes and the data values.

A one-to-one functional relationship will exist between the keys/prefixes and data values when all of the data values all of the keys/prefixes are unique. The one-to-one function may be defined mathematically as a function f with a domain D and a range R where for every element y in the range R there is exactly one element x in the domain D such that $f(x)=y$ and $f^{-1}(y)=x$. Thus, a reference database searched by the new search engine may be judged against the results produced by the one-to-one function. If the new search engine is working, then the reference database search on any given key/prefix will produce the same data value as the one-to-one function produces for the given key/prefix.

SUMMARY OF THE INVENTION

The present invention concerns a method of defining a transformation between an input signal and an output signal. The transformation may implement a pseudo-random one-to-one function that may be implemented in hardware and/or software or modeled in software. The method may comprise the steps of (A) allocating the input signal among a plurality of block input signals, (B) establishing a plurality of transfer functions where each transfer function may be configured to present a plurality of unique symbols as a block output signal responsive to said block input signal, and (C) concatenating the block output signals to form the output signal.

The objects, features and advantages of the present invention include providing a method and a circuit for generating of a pseudo-random one-to-one function in forward and inverse directions that may be suitable for creating (i) databases for test purposes, (ii) pseudo-random number generators, and/or (iii) reversible pseudo-random transformations suitable for cryptograph purposes.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
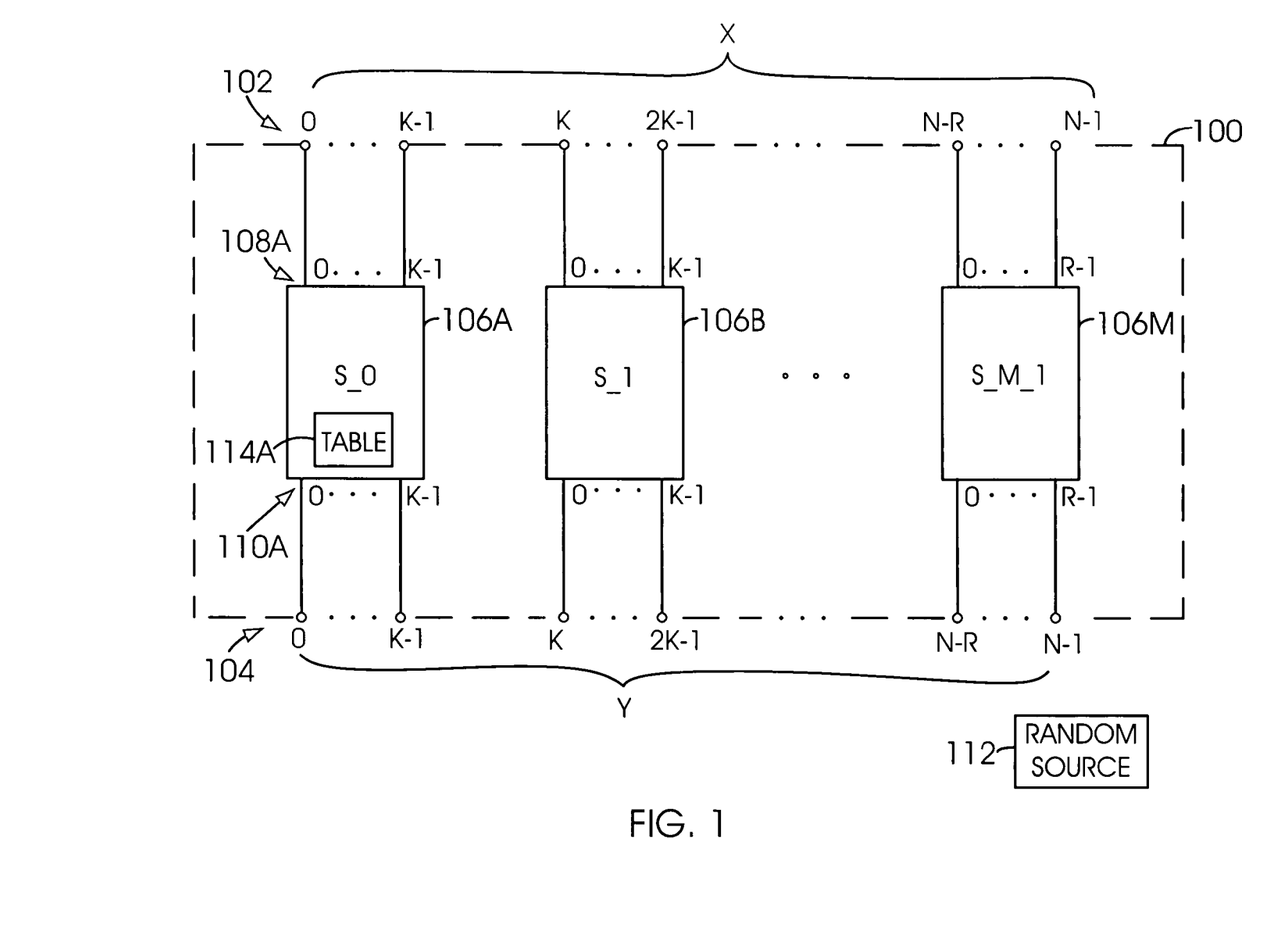
FIG. 1 is a block diagram of a circuit (having a depth of one) in accordance with a preferred embodiment of the present invention.

Referring to FIG. 1, a block diagram of a circuit 100 is shown in accordance with a preferred embodiment of the present invention. The circuit 100 may have an input 102 to receive a signal (e.g., X). The circuit 100 may have an output 104 to present a signal (e.g., Y). The circuit 100 may be configured as a pseudo-random one-to-one function.

The input 102 may comprise multiple (e.g., N) units. The output 104 may also comprise N units. Each of the N units may represent multiple bits, bytes, words, symbols, or the like. Generally, a one-to-one relationship may exist between the N units of the input 102 and the N units of the output 104. Each of the N units may also be considered as individual inputs and outputs.

The circuit 100 generally comprises multiple (e.g., M) circuits or blocks 106A–M. Each block 106A–M may have a block input 108 to receive a block input signal. Each block 106A–M may have a block output 110 to present a block output signal. The blocks 106A–M may be configured as one-to-one functions.

The input 102 may be allocated among the block inputs 108. The allocation may assign each of the N units of the input 102 to a particular unit of a block input 108. The block outputs 110 of each block 106A–M may be concatenated to form the output 104. Each of the N units of the block output 104 may be traceable back to a particular unit of a block output 110. Each block input 108 generally comprises multiple (e.g., K) units. Each block output 110 also generally comprises K units. A one-to-one relationship may exist between the K units of the block inputs 108 and the K units of the block outputs 110. Each K units of the block inputs 108 and block outputs 110 may be considered an independent input/output.

The K units of each block input 108 and the block output 110 may be fewer in number than the N units of the input 102 and the output 104. In one embodiment, the number of blocks 106A–M may be defined as a smallest integer greater than or equal to the N units divided by the K units (e.g., $M \geq N/K$). If N is not an integer multiple of K, then each block input 108 and block output 110 of the blocks 106A–L (where L=M−1) may have K units. The last block 106M may have a smaller number (e.g., R) of units, where R<K. If N is an integer multiple of K, then each block input 108 and block output 110 of the blocks 106A–M may have K units (e.g., R=K for the last block 106M).

The following definitions may be used to establish the one-to-one function of the blocks 106A–M. A function (e.g., L(S)) may denote a total number of symbols used from a random source 112 of symbols in a circuit S (e.g., blocks 106A–M). A function (e.g., S (D, N, K, T, DIR)) may denote the circuit S having a level or depth value (e.g., D), an input of N units, block inputs of K units, an initial position (e.g., T) in the random source 112, and a direction (e.g., DIR) of forward or reverse. The random source 112 may be any source of symbols where a probability of any symbols appearing is approximately the same for all symbols. In one embodiment, the random source 112 may be a compressed file having one of each possible symbol. Other random sources 112 may be used to meet the design criteria of a particular application.

Each block 106A–M may be configured to implement a one-to-one function. The one-to-one function may be a transfer function between the block input 108 and the block output 110 where for every value presented within the block input signal where is one unique value presented in the block output signal. Likewise, for every possible value presentable in the block output signal there is one unique value presented in the block input signal.

In one embodiment, the transfer function may be implemented as a pseudo-random table 114 (only one shown for clarity). The pseudo-random table 114 may have a number (e.g., K) of columns. Each of the K columns may receive one of the K units of the block input 108. The pseudo-random table 114 may have a number (e.g., $2^K$) of rows. Each of the $2^K$ rows may store a symbol selected from the random source 112. The stored symbols may have a width (e.g., K). The K width of the symbols may match the K units of the block output 110.

The pseudo-random table 114 may be denoted as a function (e.g., PRTABLE(K, T, DIR)). Since the function PRTABLE may store $2^K$ symbols, then the function L(PRTABLE) may equal $2^K$. The table 114A of the first block 106A may be filled with $2^K$ symbols from the random source 112 starting at the position T. The table 114B (not shown) of the second block 106B may be filled with another $2^K$ symbols from the random source 112 starting at the position $T+2^K$. Generally, an Ith table (not shown) may be filled with $2^K$ symbols from the random source 112 starting at the position T[I]=T[I−1]+L(S(I−1)), for $1 \leq I \leq M$, and T[0]=T. Extraction of the symbols from the random source 112 may perform a wrap-around at an end of the random source 112 if necessary.

The pseudo-random one-to-one function of the blocks 106A–M may be implemented with various circuit designs. In one example, each block 106A–M may be implemented as a memory having the block input 108 as an address interface and the block output 110 as read data interface. In another example, each block 106A–M may be implemented as a state machine having the block input signal as transition triggers and the block output signal as a current state number. In still another example, the blocks 106A–M may be implemented by a processor executing software or firmware. Other implementations of the blocks 106A–M may be provided to meet the design criteria of a particular application.

An example of a block 106, described in a hardware descriptive language (HDL) using an extended Verilog syntax, may be provided as described below. A circuit or module containing the example block 106 may have a 32-bit input 102, a 32-bit output 104, and four blocks 106. Each block 106 may have an 8-bit block input 108, an 8-bit block output 110, and a 256-row table 114 operating in the forward direction. The transfer function of each block 106 may be denoted as a memory function using the syntax "<instance type> <function name>(<input address>, <output data>)":

Module ONE_TO_ONE_1_32_8_0_0 (A, Z); //module name//
    //Fixed Module Parameters//
        Parameter D=1; //depth//
        Parameter N=32; //module I/O width//
        Parameter K=8; //block I/O width//
        Parameter T=0; //initial position//
        Parameter DIR=0; //forward//
    //Calculated Module Parameters//
        Parameter M=4; //M=Int(N/K) rounded up//
        Parameter R=8; //$R \leq K$//
    //Module Inputs/Outputs//
        Input [0:N−1]A; //input A of width N//
        Output [0:N−1]Z; //output Z of width N//
    //Allocate Inputs/Outputs to Arrays (WA and WZ) of Wires//
        Wire [0:K−1]WA[0:M−2], WZ[0:M−2]; //M−1 indices of width K//
        Wire [0:R−1]WA[M−1], WZ[0:M−1]; //Mth index of width R//
    //Input-Function-Output of First Block (S_0)/I
        Assign WA[0]=[0:K−1]A; //first K bits of A//
        PRTABLE_8_0_0 S_0(.address(A[0]),.read_data(Z[0]));
        Assign [0:K−1]Z=WZ[0]; //first K bits of Z//
    //Input-Function-Output of Second Block (S_1)//
        Assign WA[1]=[K:2*K−1]A; //second K bits of A//
        PRTABLE_8_256_0 S_1(.address(WA[1]),.read_data(Z[1]));
        Assign [K:2*K−1]Z=WZ[1]; //second K bits of Z//
    //Input-Function-Output of Third Block (S_2)//
        Assign WA[2]=[2*K:3*K−1]A; //third K bits of A//
        PRTABLE_8_512_0 S_2(.address(WA[2]),.read_data(WZ[2]));
        Assign [2*K:3*K−1]Z=WZ[2]//third K bits of Z//
    //Input-Function-Output of Fourth Block (S_3)//
        Assign WA[3]=[3*K:N−1]A; //fourth K bits of A//
        PRTABLE_8_768_0 S_3(.address(WA[3]),.read_data(WZ[3]));
        Assign [3*K:N−1]Z=WZ[3]; //fourth K bits of Z//
Endmodule Each symbol in each table 114 may be unique and may relate to a unique value received at the block input 108. As a result, for each value received at the block input 108 there may be a unique symbol or value presented at the block output 110. In other words, the table 114 may represent a one-to-one function in the forward direction. Likewise, for each possible value presentable at the block output 110 there may be a uniquely associated value receivable at the block input 108. In other words, the table 114 may reversible. A combination of the blocks 106A–M may perform the one-to-one function between the signal X at the input 102 and the signal Y at the output 104.

The above HDL may be used to generate a computer simulation model for the circuit 100. In turn, a reference database having pseudo-random entries where each entry has a key/prefix and a data value may be generated using the model. The keys/prefixes may be the values presented as the signal X to the model. The data values may be the values presented in the signal Y by the model. The resulting reference database may be useful for testing search engines that utilize the keys and/or prefixes to search for the data values.

Figure 2:
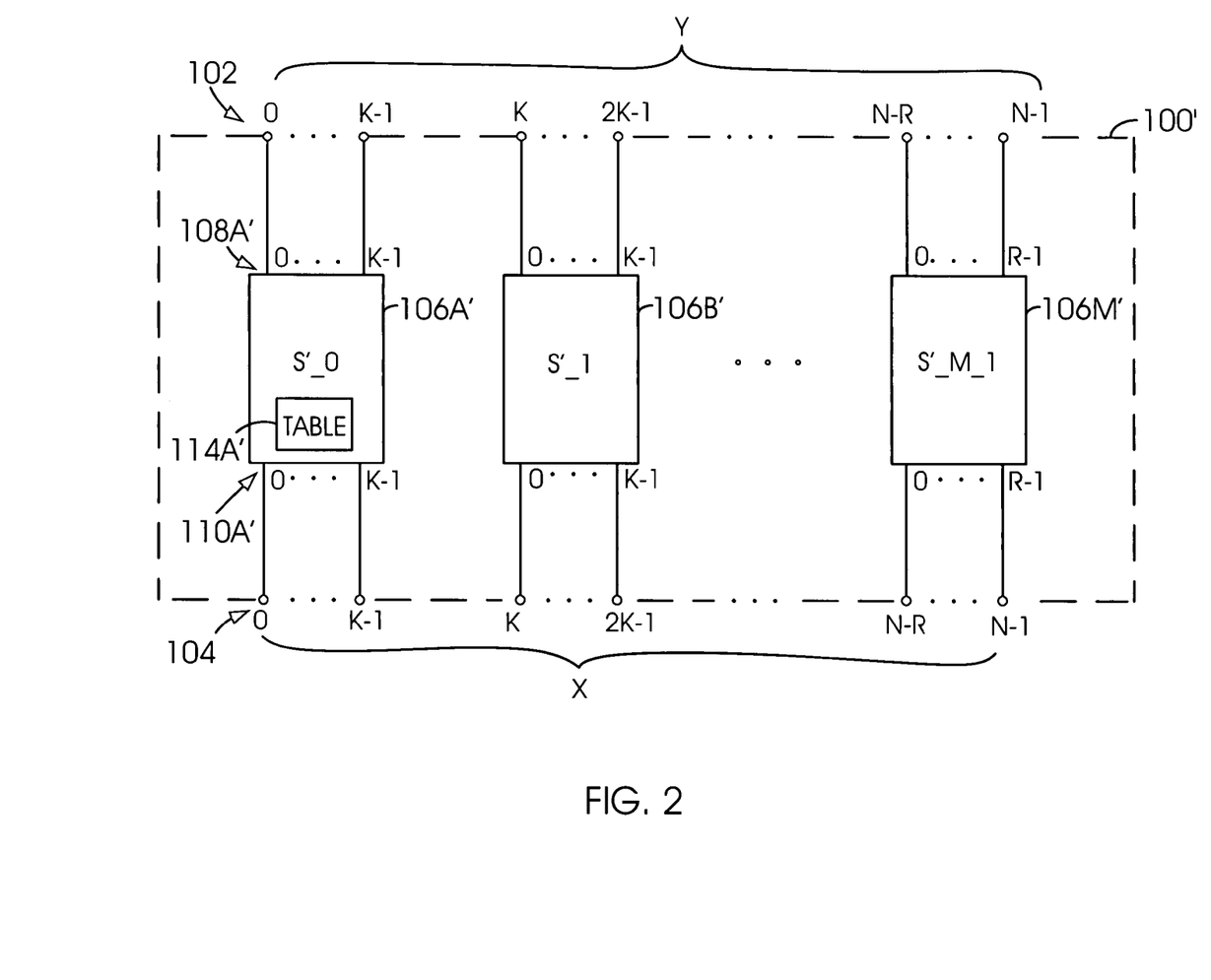
FIG. 2 is a block diagram of a circuit operating in a reverse direction of the circuit shown in FIG. 1.

Referring to FIG. 2, a block diagram of a circuit 100' is shown. The circuit 100' may be configured to perform another transfer function that is a reverse of the transfer function performed by the circuit 100. The circuit 100' may have the same input 102, the same output 104, and the same number of blocks 106A–M as the circuit 100. Differences between the circuit 100 and the circuit 100' may include receiving the signal Y at the input 102 and presenting the signal X at the output 104. Furthermore, the tables 114' of the circuit 100' may be loaded differently than the tables 114 of the circuit 100.

The tables 114' may be configured to receive a portion of the signal Y and present a portion of the signal X. The signal Y portion received at the block input 108 may be represented by the K columns of the table 114'. The signal X portion may be represented at the block output 110 by the values stored in each of the 2 ^K rows of the table 114'. In memory device terminology, the table 114' may have the address values and the data values interchanged such that the device receives the data values at address inputs and presents address values at data outputs.

Figure 3:
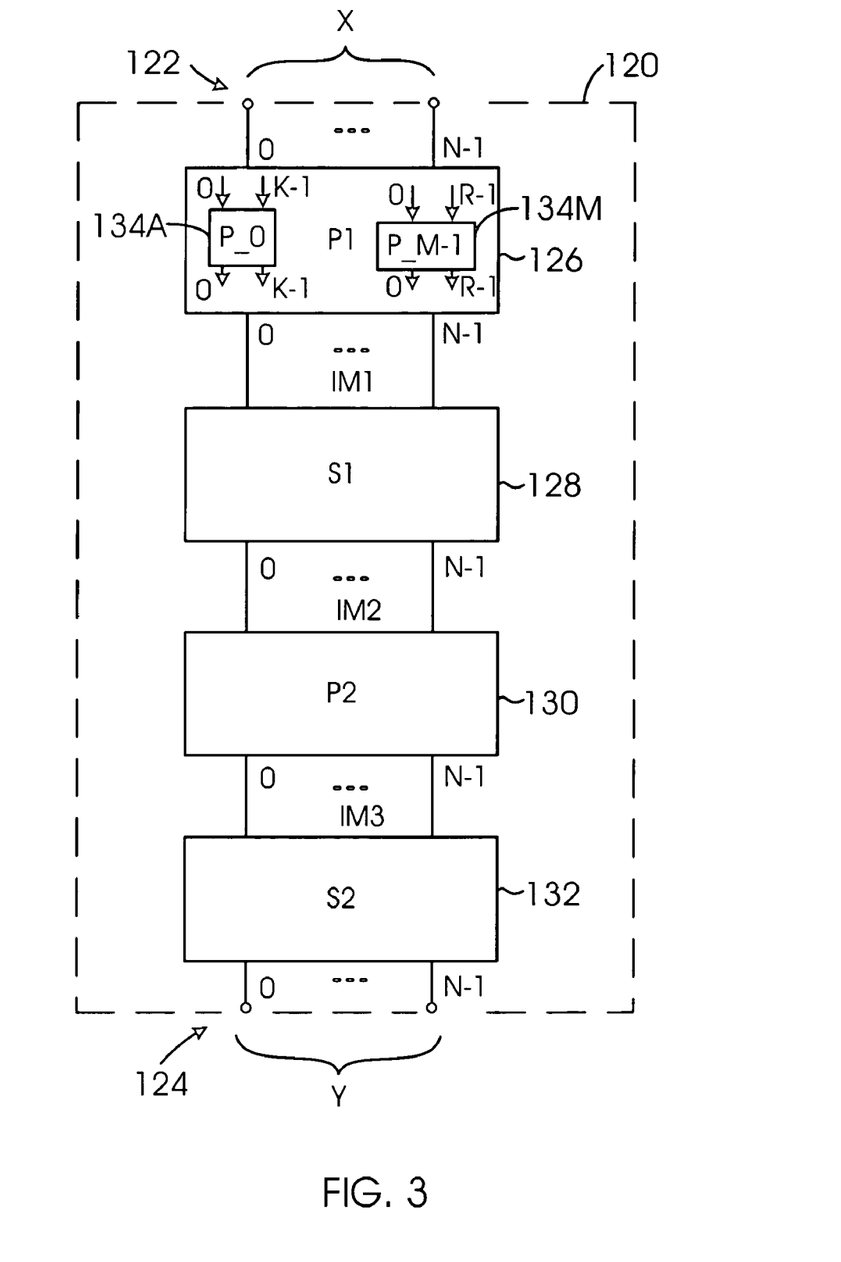
FIG. 3 is a block diagram of a circuit having a depth of greater than one.

Referring to FIG. 3, a block diagram of an example circuit 120 having a depth of greater than one is shown. The circuit 120 may have an input 122 to receive the signal X and an output 124 to present the signal Y. The input 122 may be configured N units wide. The output 124 may also be configured N units wide.

The circuit 120 generally comprises a circuit 126, a circuit 128, a circuit 130 and a circuit 132. The circuit 126 may be configured to provide the input 102 to receive the signal X. The circuit 126 may present a signal (e.g., IM1) to the circuit 128 responsive to the signal X. The circuit 128 may present a signal (e.g., IM2) to the circuit 130 responsive to the signal IM1 The circuit 130 may present a signal (e.g., IM3) to the circuit 132 responsive to the signal IM2. The circuit 132 may present the signal Y at the output 124 responsive to the signal IM3. The circuits 128 and 132 may be configured to implement one-to-one functions (of depth one) similar to the one-to-one function described for the circuit 100. The circuits 126 and 130 may be configured to implement permutation functions on the signals.

The circuits 126 and 130 may be configured to present the input signals (e.g., X and IM2) as the output signals (e.g., IM1 and IM3) with the units rearranged or scrambled in a random or pseudo-random fashion. For example, the first (e.g., left-most) unit of the signal X received the input 122 of the circuit 126 may be presented as the Nth unit (e.g., right-most) of the signal IM1. As a result, the permutations circuits 126 and 130 may also perform a pseudo-random one-to-one type function.

The signal IM1 may be implemented as a first intermediate result signal. The signal IM2 may be implemented as a second intermediate result signal. The signal IM3 may be implemented as a third intermediate result signal.

Each of the permutation circuits 126 and 130 may comprise multiple permutation blocks 134A–M. The permutation blocks 134A–L (where L=M−1) may each have an input and an output of K units wide. The last permutation block 134M may have an input and an output of R units wide.

Each permutation block 134 may be denoted as a function (e.g., PRPERMUT(K, PT, DIR)). The parameter K may define a width of the permutation block inputs. The parameter PT may define a starting point within the random source. The parameter DIR may define a direction (e.g., forward and reverse).

The circuit 126 may provide a pseudo-random one-to-one function between the signal X and the signal IM1. The permutation circuit 130 may scramble the units of the signal IM1 to present the signal IM2. The circuit 130 may provide another pseudo-random one-to-one function between the signal IM2 and the signal IM3. The permutation circuit 132 may further scramble the units of the signal IM3 to present the signal Y. As a result, the signal X may undergo four pseudo-random transfer functions (e.g., depth=4) before being presented as the signal Y. Since each circuit 126, 128, 130, and 132 may be configured to perform a one-to-one type function, then the circuit 120 may also perform a one-to-one type function between the signal X and the signal Y.

An HDL representation of the circuit 120 may be provided below. The circuit 128 may be denoted as S1=S(D−1, N, K, T1, DIR), where T1 may equal T. The circuit 132 may be denoted as S2=S(D−1, N, K, T2, DIR), where T2 may equal T1+L(S1). The circuit 126 may be denoted as P1=PRPERMUT(K, PT1, DIR), where PT1 may equal T2. The circuit 130 may be denoted as P2=PRPERMUT(K, PT2, DIR), where PT2 may equal PT1+L(P1):

```
Module ONE_TO_ONE_4_32_8_0_0 (A, Z); //module name//
   //Fixed Module Parameters//
      Parameter D=4; //depth//
      Parameter N=32; //module I/O width//
      Parameter K=8; //block I/O width//
      Parameter T=0; //initial position//
      Parameter DIR=0; //forward///
   //Module Inputs/Outputs//
      Input [0:N−1]A; //input A of width N//
      Output [0:N−1]Z; //output Z of width N//
   //Intermediate Input/Output Wire Arrays (W0, W1, and W2)//
      Wire [0:K−1]W0, W1, W2; //width K//
   //Function of First Circuit (P1)//
      PRPERMUT_8_7542_0 P1(.Z(WO),.A(A));
   //Function of Second Circuit (S1)//
      ONE_TO_ONE_THIRD_32_8_0_0 S1(.A(WO),.Z(W1));
   //Function of Third Circuit (P2)//
      PRPERMUT_8_7573_0 P2(.Z(W2),.A(W1));
   //Function of Fourth Circuit (S2)//
      ONE_TO_ONE_THIRD_32_8_3770_0 S2(.A(W2).Z(Z));

Endmodule
```

Figure 4:
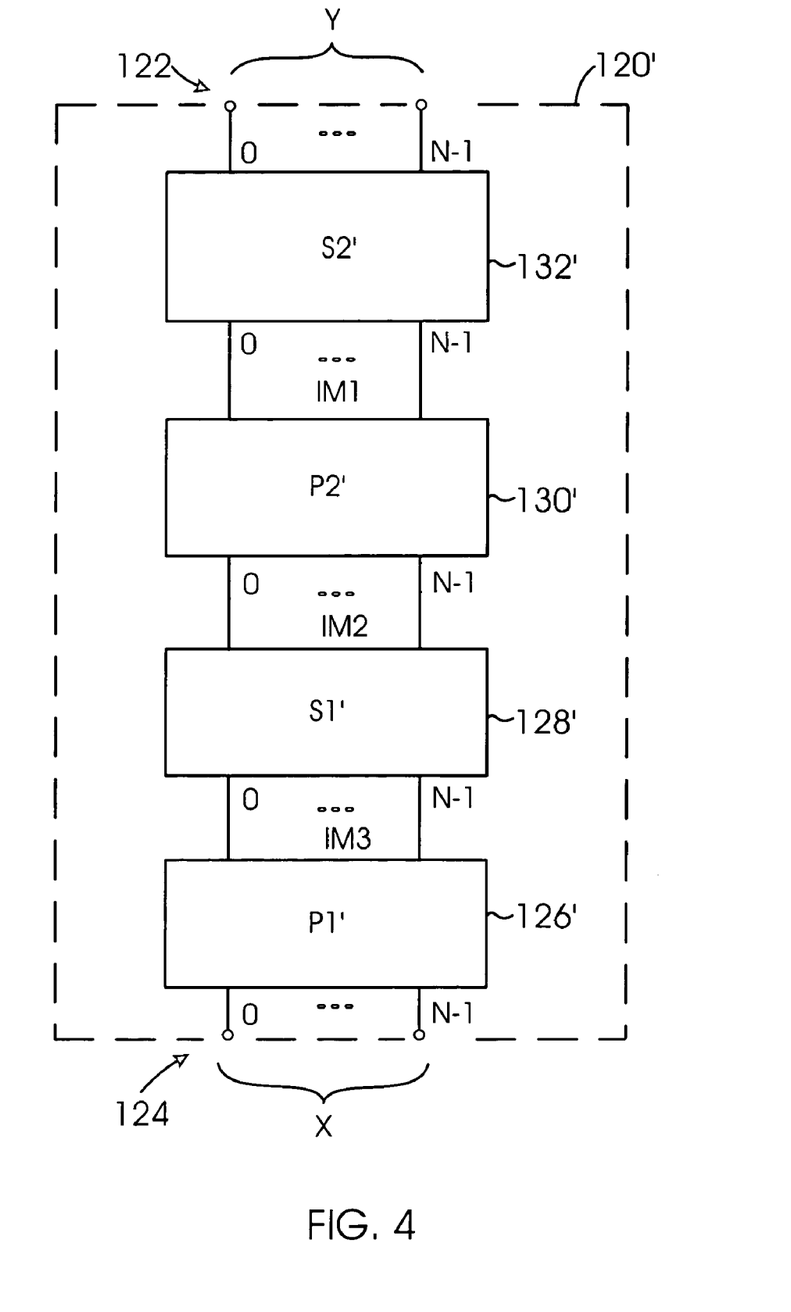
FIG. 4 is a block diagram of a circuit operating in a reverse direction of the circuit shown in FIG. 3.

Referring to FIG. 4, a block diagram of a circuit 120' is shown. The circuit 120' may be configured to operate as the circuit 120 in the reverse direction. The circuit 120' may receive the signal Y at the input 122 and present the signal X at the output 124.

The circuit 120' generally comprises a circuit 126', a circuit 128', a circuit 130', and a circuit 132'. The circuits 126', 128', 130', and 132' may be in an opposite order from the circuits 126, 128, 130, and 132 of the circuit 120. The circuit 132' may have the input 122 to receive the signal Y. The circuit 132' may present the signal IM1 to the circuit 130' responsive to the signal Y. The circuit 130' may present the signal IM2 to the circuit 128' responsive to the signal IM1. The circuit 128' may present the signal IM3 to the circuit 126' responsive to the signal IM2. The circuit 126' may present the signal X at the output 124 responsive to the signal IM3.

An HDL representation of the circuit 120' may be provided as follows:

Module ONE_TO_ONE_4_32_8_0_1 (A, Z); //module name//
  //Fixed Module Parameters//
    Parameter D=4; //depth//
    Parameter N=32; //module I/O width//
    Parameter K=8; //block I/O width//
    Parameter T=0; //initial position//
    Parameter DIR=1; //reverse///
  //Calculated Module Parameters//
    Parameter M=32; //M=Int(N/K) rounded up//
    Parameter R=8; //R≦K//
  //Module Inputs/Outputs//
    Input [0:N−1]A; //input A of width N//
    Output [0:N−1]Z; //output Z of width N//
  //Intermediate Input/Output Wire Arrays (W0, W1, and W2)//
    Wire [0:K−1]W0, W1, W2; //width K//
  //Function of First Circuit (S2')//
    ONE_TO_ONE_THIRD_328_3770_1 S2'(.A(A),.Z(W0));
  //Function of Second Circuit (P2')//
    PRPERMUT_8_7573_1 P2'(.Z(W),.A(WO));
  //Function of Third Circuit (S1')//
    ONE_TO_ONE_THIRD_32_8_0_1 S1'(.A(W1),.Z(W2));
  //Function of Fourth Circuit (P1')//
    PRPERMUT 8_7542_1 P1'(.Z(Z),.A(W2));

Endmodule

Figure 5:
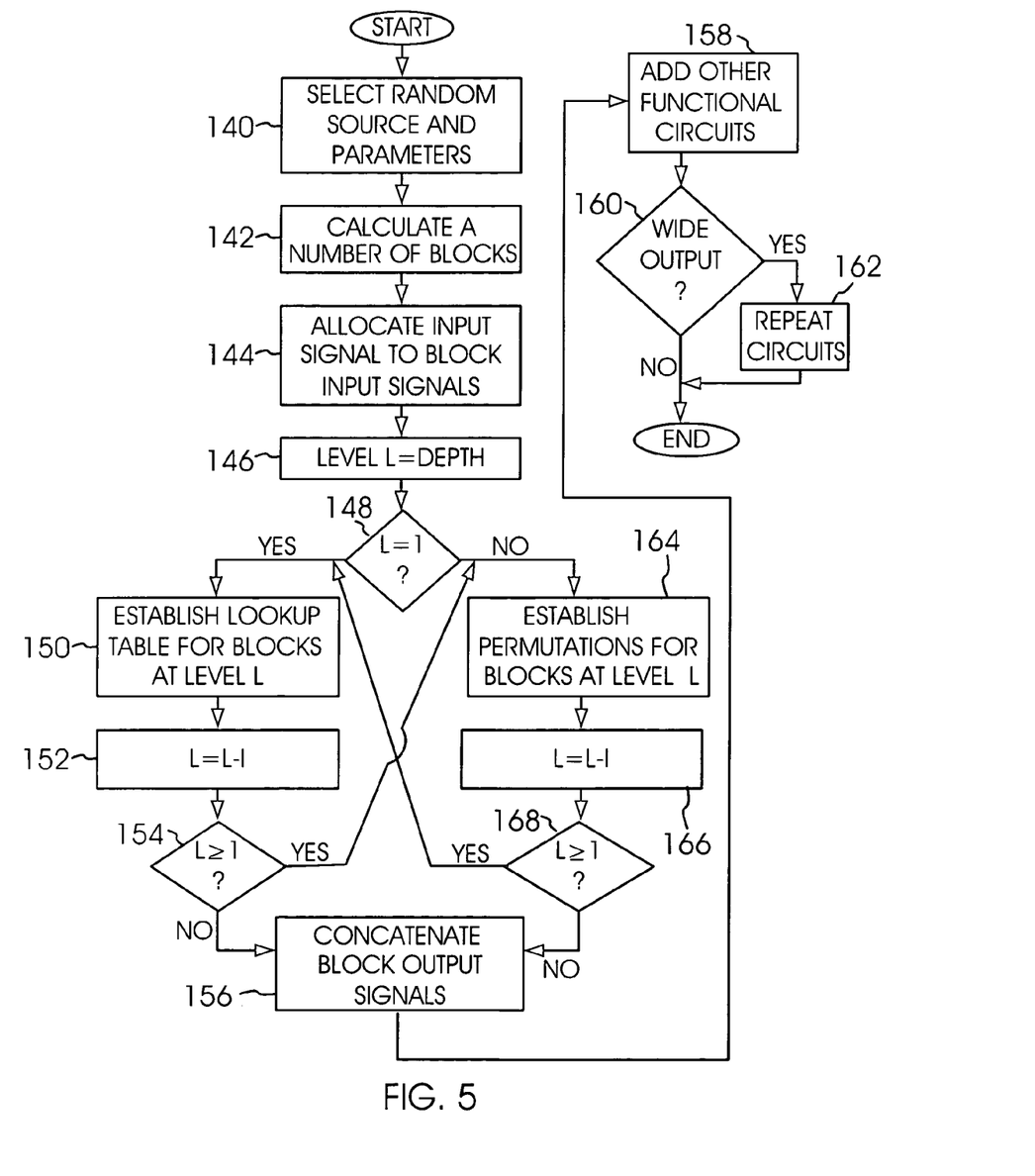
FIG. 5 is a flow diagram of a method of defining a pseudo-random one-to-one function type circuit.

Referring to FIG. 5, a flow diagram of a method of defining a pseudo-random one-to-one function type circuit is shown. The method may begin by selecting the random source and the parameters for the pseudo-random circuit (e.g., block 140). Calculated parameters, such as the value of M for the number of blocks, may then be determined (e.g., block 142). An input signal (e.g., signal X) may be allocated among the block input signals (e.g., block 144). A level counter (e.g., L) may also be set to the depth parameter D (e.g., block 146).

A check may be made to decide if the current level L is the first level (e.g., decision block 148). If the current level L is the first level (e.g., the YES branch of the decision block 148), then the lookup tables may be established for the pseudo-random one-to-one function of the current level L (e.g., block 150). The current level L may then be decremented by one level (e.g., block 152).

Another check may be made to decide if there are no more levels to synthesize (e.g., decision block 154). If there are no more levels (e.g., the NO branch of decision block 154), then the block output signals of the first level blocks may be concatenated in series to form an output signal (e.g., block 156). Any additional functional circuits may then be added to the pseudo-random circuit (e.g., block 158).

A check may be made to decide if the final output signal is to be wider than a block output signal of an individual pseudo-random circuit (e.g., decision block 160). If the final output signal is to be wider (e.g., the YES branch of decision block 160), then the pseudo-random circuit and any added circuits may be repeated as necessary to achieve the desired final width (e.g., block 162). If the final output signal is to have the same width as the pseudo-random circuit (e.g., the NO branch of decision block 160), then the process may be ended.

If the pseudo-random circuit has a depth greater than one level (e.g., the NO branch of decision block 148) or if more levels may still need to be created (e.g., the YES branch of decision block 154), then a permutation transfer function may be established for each permutation block of the current level (e.g., block 164). The current level may then be decremented by one level (e.g., block 166).

Another check may be made to decide if additional levels may still need definition. If additional levels may still need to be created (e.g., the YES branch of decision block 168 or the YES block of the decision block 154), then the process may continue with establishing a lookup table transfer function (e.g., block 150). If no additional levels may be necessary (e.g., the NO branch of decision block 168), then the process may continue with concatenation of the block outputs (e.g., block 156).

The pseudo-random one-to-one functionality of the present invention may have many applications. For example, an N-bit wide pseudo-random number generator may be implemented using the circuit 100 and a counter. In another example, an M-bit wide (M>N) pseudo-random number generator may be implemented using multiple instances of the N-bit wide pseudo-random number generator. In still another example, the circuits 100, 100', 120, and 120' may be applied to cryptography.

Figure 6:
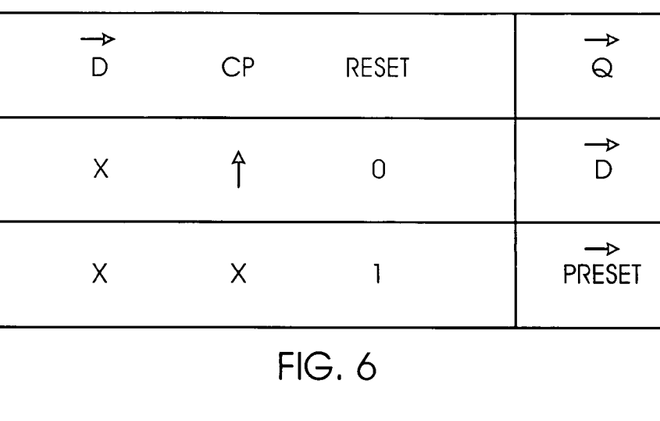
FIG. 6 is a truth table of a D-type flip-flop.

Referring to FIG. 6, a truth table of a D-type flip-flop is shown. The flip-flop may have an input to receive a signal (e.g., D). The flip-flop may have another input to receive a clock signal (e.g., CP). An output of the flip-flop may present a signal (e.g., Q). The flip-flop may be configured to present and hold the signal Q equal to the signal D upon a rising edge of the clock signal CP.

The flip-flop may have an input to receive a signal (e.g., RESET). The signal RESET may have a logical one state and a logical zero state. While the signal RESET is in the logical zero state, the signal Q may respond to the signal D. While the signal RESET is in the logical one state, the signal Q may have a preset value (e.g., typically a logical one) regardless of the signal D.

The flip-flop and the circuit 100 may be used to design a pseudo-random generator (PRG). The PRG may have a deterministic process that presents numbers with certain distribution properties. Roughly speaking, the presented numbers should behave similarly to realizations of independent, identically distributed random variables.

Figure 7:
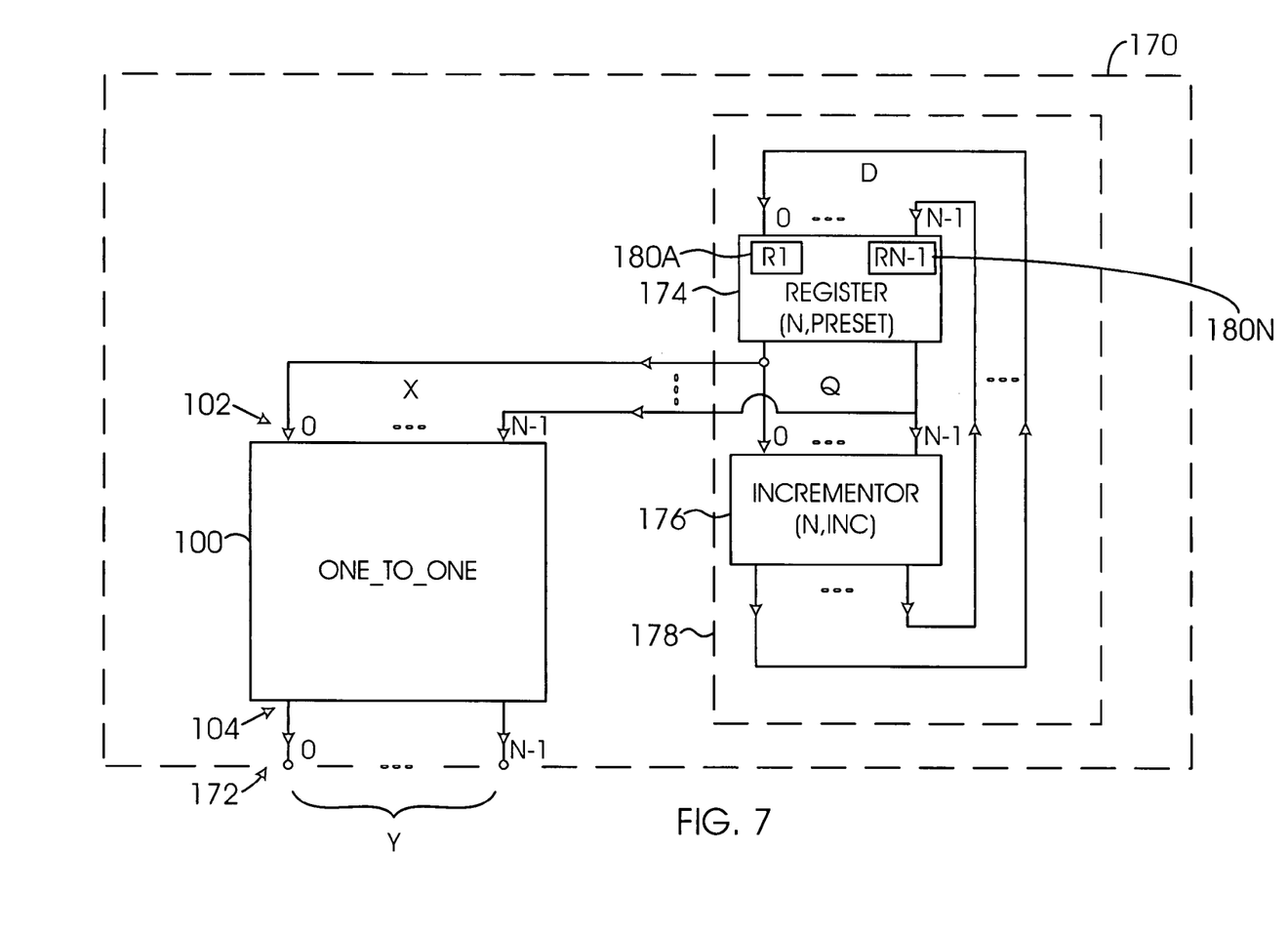
FIG. 7 is a block diagram of a pseudo-random generator.

Referring to FIG. 7, a block diagram of a PRG circuit 170 is shown. The circuit 170 may have an output 172 to present the signal Y. The signal Y may be implemented with an N bit (or unit) wide signal.

The circuit 170 generally comprises a circuit 174, a circuit 176, and the circuit 100. The circuit 174 may be implemented as an N-bit wide register. The circuit 176 may be implemented as an N-bit wide incrementor. The register 174 may receive an N-bit wide signal (e.g., D) from the incrementor 176. The register 174 may present an N-bit wide signal (e.g., Q) to the incrementor 176. The register 174 and the incrementor 176 may be configured to function as a wrap-around counter 178. The signal Q may be presented to the input 102 of the circuit 100 as the signal X (e.g., signal X=signal Q). The output 104 of the circuit 100 may be connected to the output 172 of the PRG circuit 170.

The wrap around counter 178 may increment the signal X one step per clock cycle. The circuit 100 may present the signal Y as a randomized version of the signal X. Since the circuit 100 may have a one-to-one function, each value of the signal X may produce a unique value for the signal Y. As a result, one cycle of the signal X through all possible values may produce a pseudo-random pattern within the signal Y where each value may be unique and presented once per cycle.

The register 174 may comprise multiple flip-flops 180A–N. Each flip-flop 180A–N may receive one bit of the signal D and may present one bit of the signal Q. The flip-flops 180A–N may be implemented as D-type flip-flops. Other types of flip-flops may be implemented to meet the design criteria of a particular application.

A function of the register 174 may be denoted as REGISTER (N, PRESET) where N represents an N-vectorial flip-flop and PRESET is an initial setting. A function of the incrementor circuit 178 may be denoted as INCREMENTOR (N, INC) where N indicates an input/output bit-width and INC represents an increment step size.

A transfer function for the register 174 may use the syntax <instance type> <function name>(<input>,<output>). A transfer function for the incrementor 176 may use the syntax <instance type> <function name>(<input>,<output>). An HDL representation of the PRG circuit 170 may be as follows:

Module GENERATOR$_{13}$4_0 (Z); //module name//
  //Fixed Module Parameters//
    Parameter N=32; //module output width//
    Parameter K=8; //block I/O width//
    Parameter INC=4; //increment step size//
    Parameter PRESET=0; //preset off///
  //Calculated Module Parameters//
    Parameter M=4; //M=Int(N/K) rounded up//
    Parameter R=4; //R≦K//
  //Module Outputs//
    Output [0:N−1]Z; //output Z of width N//
  //Functions//
    REGISTER_32_0 register(.D(before),.Q(after));
    ONE_TO_ONE_4_32_8_0_0 one-to-one(.A(after),.Z(Z));
    INCREMENTOR_32_4 incrementor(.A(after),.Z(before));

Endmodule

Figure 8:
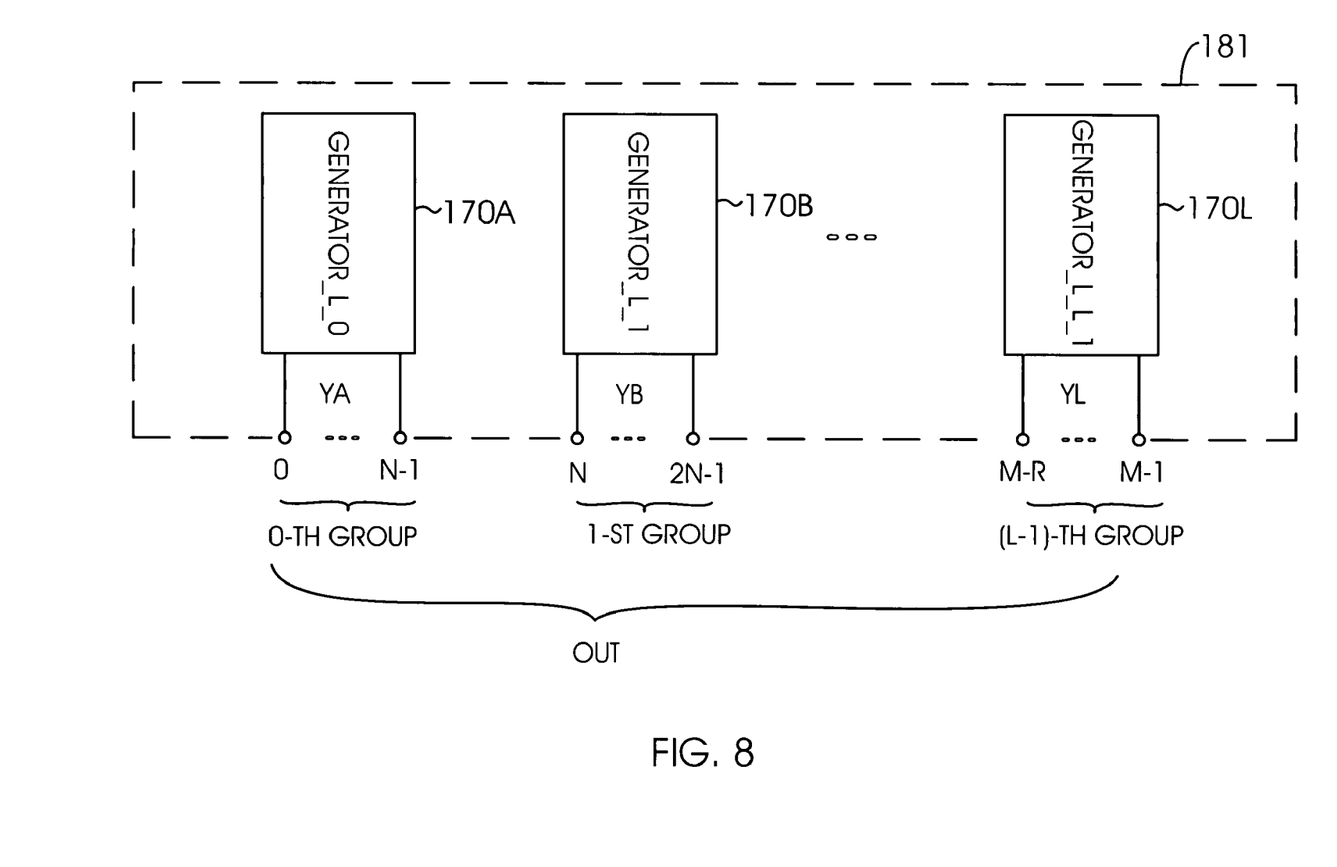
FIG. 8 is a block diagram of another pseudo-random generator.

Referring to FIG. 8, a block diagram of a PRG circuit 181 having an output width of greater than N bits is shown. The circuit 181 may comprise a number (e.g., L) of instances of the PRG circuit 170. The PRG circuits 170A–K may each present an N-bit wide output signal (e.g., YA–YK). The last PRG circuit 170L may present an R-bit wide output signal (e.g., YL). The output signals YA–YL may be concatenated in series to present an M-bit wide signal (e.g., OUT), where M>N. The number L may be a smallest integer at least as great as the value M divided by the value N (e.g., L≧M/N). A value of R may be equal to the value of N when M is an integer multiple of N. The value of R may be less than the value of N when M is not an integer multiple of N.

An HDL representation of the PRG circuit 181 may be provided as follows:

Module PRG_100 (Z); //module name//
  //Fixed Module Parameters//
    Parameter M=100; //module output width//
    Parameter N=32; //partial output widths//
  //Calculated Module Parameters//
    Parameter 4=4; //L=Int(M/N) rounded up//
    Parameter R=4; //R≦L//
  //Module Outputs//
    Output [0:M−1]Z; //output Z of width M//
  //Intermediate Input/Output Wire Array (W)//
    Wire [0:N−1]W[0:L−1]; //L indices of width N//
  //Functions//
    GENERATOR_4_0 generator_0(.Z(W[0]));
    GENERATOR_4_1 generator_1(.Z(W[1]));
    GENERATOR_4_2 generator_2(.Z(W[2]));
    GENERATOR_4_3 generator_3(.Z(W[3]));
  //Concatenate Generator Circuit Outputs//
    Assign [0:31] Z=W[0]; //first 32 bits of OUT//
    Assign [31:64] Z=W[1]; //second 32 bits of OUT//
    Assign [64:95] Z=W[0]; //third 32 bits of OUT//
    Assign [96:99] Z=[0:3]W[3]; //final 4 bits of OUT//

Endmodule

Figure 9:
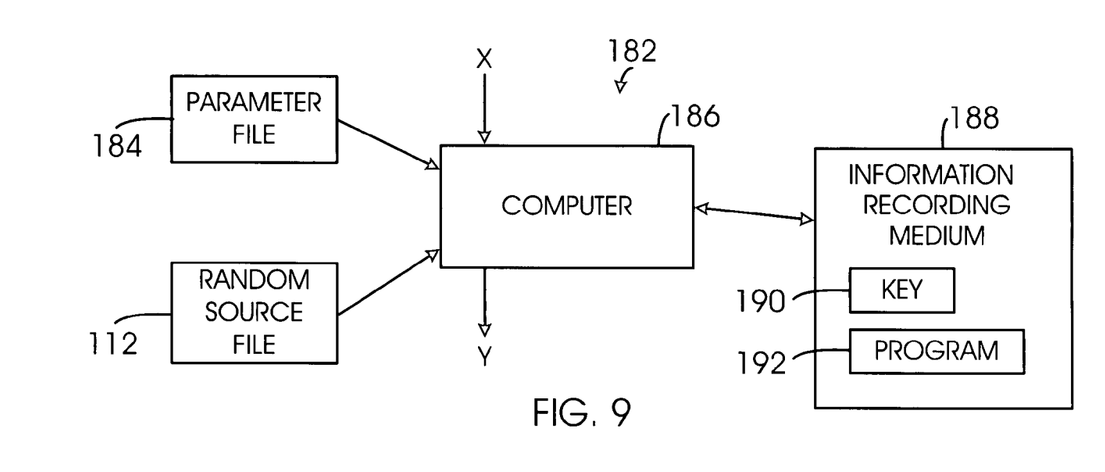
FIG. 9 is a block diagram of a computer system executing a one-to-one function in accordance with the present invention.

Referring to FIG. 9, a block diagram of a system 182 executing the one-to-one function of the present invention is shown. The system 182 may comprise a parameter file 184, the random source 112, a computer 186, and an information recording medium 188. The computer 186 have and input to receive the signal X and an output to present the signal Y. The computer 186 may be configured to implement a one-to-one function (e.g., Y=F(X)) to present the signal Y as a pseudo-random version of the signal X. In other words, the signal Y may be an encrypted version of the unencrypted signal X.

The one-to-one function F performed by the computer 186 may be dependent upon the parameters (e.g., D, N, K, T, DIR) and an ordering of the symbols within the random source 112. Knowing the parameters D, N, K, T, DIR and the random source 112, then a reverse direction one-to-one function (e.g., X=G(Y)) may be applied to the encrypted signal Y to recover the original unencrypted signal X. However, if one or more of the parameters and/or the random source 112 remains a secret, then the secret parameter(s) and/or random source 112 may comprise a secret encryption key. For example, the starting point T and the width K may comprise the secret encryption key while all of the other parameters and the random source 112 are public knowledge.

The computer 186 may store the secret key in the information recording medium 188 as a file 190 for transportation from an encryption location to a decryption location. Knowledge of all parameters and the random source 112 may allow decryption of an encrypted message generated by the computer 186. The decryption may be achieved by implementing the one-to-one function G at the decryption location that is the inverse of the one-to-one function F used by the computer 186 at the encryption location.

Generally, the information recording medium 188 may store a computer program for generating any one-to-one function in accordance with the present invention. The computer program may be read from a file 192 stored in the information recording medium 188 into the computer 186. The computer 186 may then execute the computer program to transform between the signal X and the signal Y in the forward and/or reverse directions.

The present invention may also be used in private/public key cryptography. The computer 186 may receive the parameters as a private key. The computer 186 may use the parameters to generate the function Y=F(X). The function F may serve as a public key. Without knowing the parameters, the function F may be considered a one-way function in the public domain. The public key F may be transported by any means to the encryption location where it is used to encrypt the message X to produce the encrypted message Y.

The encrypted message Y may be transported by any means back to the decryption location. At the decryption location, the inverse function X=G(Y) may be defined using the parameters that make up the private key. The inverse function G may then decrypt the encrypted message Y to recover the original message X.

The various signals of the present invention are generally shown on individual inputs and outputs. In other embodiments, some or all of the various signals may be multiplexed through one or more inputs and/or outputs as desired or required. The various signal of the present invention may also be implemented as single-bit or multi-bit signals in a serial and/or parallel configuration.

The function performed by the flow diagram of FIG. 5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be an information storage medium including instructions which can be used to program a computer to perform a process in accordance with the present invention. The storage medium can include, but is not limited to, any type of disk including floppy disk, optical disk, CD-ROM, and magneto-optical disks, ROMs, RAMS, EPROMs, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. A method of transforming between an input signal and an output signal of a circuit, the method comprising the steps of:
   (A) copying a plurality of symbols from a source file to a plurality of tables of said circuit;
   (B) allocating said input signal among a plurality of block input signals;
   (C) generating a plurality of to (i) one of said block output signals each input signals and (ii) said responsive symbols in one of said tables; and
   (D) concatenating said block output signals to form said output signal of said circuit, wherein each of said symbols in said source file has equal probability of appearance.

2. The method according to claim 1, wherein the step of concatenating comprises the sub-steps of:
   concatenating said block output signals to form an intermediate result; and
   permutating each of a plurality of portions of said intermediate result to present said output signal.

3. The method according to claim 1, wherein each of said tables comprise k columns and 2^k rows, where k is a bit width of each of said block input signals and each of said rows stores a unique one of said symbols.

4. The method according to claim 1, further comprising the steps of:
   (i) selecting a staring point within said source file to extract said symbols for a first table of said tables;
   (ii) calculating a number of symbols extracted for said first table; and
   (iii) calculating a subsequent starting point to extract said symbols for a subsequent table of said tables based upon said starting point and said number.

5. The method according to claim 4, further comprising the step of:
   presenting both a bit width of said block signals and said starting point external to said circuit as a cryptographic key.

6. The method according to claim 1, wherein a predetermined number of units of said input signal are allocated to a plurality of said block input signals.

7. The method according to claim 6, wherein fewer than said predetermined number of units are allocated to one of said block input signals.

8. The method according to claim 1, further comprising the step of:
   generating said input signal by counting a clock signal.

9. The method according to claim 8, further comprising the steps of:
   generating a plurality of said output signals in response to a plurality of said countings; and
   concatenating said plurality of output signals to present a second output signal.

10. An information recording medium for use in a computer to define a transformation between an input signal and an output signal, the information recording medium recording a computer program that is readable and executable by the computer, the computer program encoded on information readable medium that when executed on a computer implements the following steps:
    (A) copying a plurality of symbols from a source file to a plurality of tables;
    (B) allocating said input signal among a plurality of block input signals;
    (C) generating a plurality of block output signals each responsive to one of said block input signals and said symbols in one of said tables;
    D) concatenating said block output signals to form said output signal; and
    (E) generating said input signal by counting a clock signal.

11. The information recording medium according to claim 10, wherein the step of concatenating in said computer program comprises the sub-steps of:
    concatenating said block output signals to form an intermediate result; and
    permutating each of a plurality of portions of said intermediate result to present said output signal.

12. The information recording medium according to claim 10, wherein each of said tables comprise k columns and 2^k rows, where k is a bit width of each of said block input signals and each of said rows stores one of said symbols.

13. The information recording medium according to claim 10, wherein each of said symbols in said source file has an approximately equal probability of appearance.

14. The information recording medium according to claim 10, wherein said computer program further comprising the steps of:
(i) selecting a staring point within said source file to extract said symbols for a first table of said tables;
(ii) calculating a number of symbols extracted for said first table; and
(iii) calculating a subsequent starting point to extract said symbols for a subsequent table of said tables based upon said starting point and said number.

15. The information recording medium according to claim 14, wherein said computer program further comprising the step of:
presenting both a bit width of said block signals and said starting point external to said computer as a cryptographic key.

16. The information recording medium according to claim 10, wherein said computer program allocates a predetermined number of units of said input signal to a plurality of said block input signals.

17. The information recording medium according to claim 16, wherein said computer program allocates fewer than said predetermined number of units to one of said block input signals.

18. A circuit comprising:
means for copying a plurality of symbols from a source file to a plurality of tables;
means for allocating an input signal among a plurality of block input signals;
means for generating a plurality of block output signals each responsive to (i) one of said block input signals and (ii) said symbols in one of said tables; and
means for concatenating said block output signals to form an output signal, wherein each of said symbols in said source file has an equal probability of appearance.

* * * * *